United States Patent
Mamo et al.

(10) Patent No.: US 11,762,749 B2
(45) Date of Patent: Sep. 19, 2023

(54) SOFTWARE APPLICATION INTELLIGENCE PLATFORM, AND METHOD THEREOF

(71) Applicant: Bionic Stork Ltd., Tel Aviv (IL)

(72) Inventors: Eyal Mamo, Tel Aviv-Yaffo (IL); Idan Ninyo, Tel Aviv-Yaffo (IL); Amir Sidis, Tel Aviv-Yaffo (IL); Omri Ivanir, Tel Aviv-Yaffo (IL)

(73) Assignee: BIONIC STORK LTD., Tel Aviv (IL)

( * ) Notice: Subject to any disclaimer, the term of this patent is extended or adjusted under 35 U.S.C. 154(b) by 76 days.

(21) Appl. No.: 17/513,117

(22) Filed: Oct. 28, 2021

(65) Prior Publication Data
US 2023/0138806 A1 May 4, 2023

(51) Int. Cl.
*G06F 11/30* (2006.01)
*G06F 11/32* (2006.01)

(52) U.S. Cl.
CPC ........ *G06F 11/302* (2013.01); *G06F 11/3051* (2013.01); *G06F 11/3075* (2013.01); *G06F 11/328* (2013.01)

(58) Field of Classification Search
CPC ............... G06F 11/302; G06F 11/3051; G06F 11/3075; G06F 11/328
See application file for complete search history.

(56) References Cited

U.S. PATENT DOCUMENTS

| 11,442,765 B1* | 9/2022 | Zhang ................. G06F 9/30145 |
| 2011/0066719 A1 | 3/2011 | Miryanov et al. |
| 2018/0131558 A1* | 5/2018 | Sharma ............. G06Q 10/0637 |
| 2020/0396232 A1 | 12/2020 | Lee |

FOREIGN PATENT DOCUMENTS

EP 2431879 A1 3/2012

OTHER PUBLICATIONS

International Search Report for PCT Application No. PCT/IB2022/059622. The International Bureau of WIPO.
Written Opinion of the International Searching Authority for PCT Application No. PCT/IB2022/059622 dated Dec. 6, 2022. The International Bureau of WIPO.

* cited by examiner

*Primary Examiner* — Nadeem Iqbal
(74) *Attorney, Agent, or Firm* — M&B IP Analysts, LLC

(57) ABSTRACT

A system and method for providing intelligence of software applications. The method comprises collecting, from a plurality of resources, data utilized to at least execute a plurality software applications of an organization; analyzing the collected data to identify the plurality of software applications; determining, by using a static analysis process, dependencies between the software applications of the identified plurality of software applications; compiling visibility data based on the identified plurality of software applications and the determined dependencies; generating a dataflow map, wherein the dataflow map includes the visibility data; and enabling a control of at least one policy based on the visibility data included in the dataflow map.

23 Claims, 4 Drawing Sheets

SOFTWARE APPLICATION INTELLIGENCE PLATFORM, AND METHOD THEREOF

TECHNICAL FIELD

The present disclosure relates to the field of software development techniques and, more particularly, to techniques for leveraging application intelligence to provide better visibility and control to software applications.

BACKGROUND

Almost every organization relies on software applications to operate. Software applications can range from on-prem monolithic applications to hosted cloud-native microservice. Such applications can be deployed on-premises or in cloud computing platforms. Regardless of the deployment, a software application executed by an organization, or an enterprise, is required to comply with control, security, and governance policies. However, as organizations transform into software driven organizations and require transforming new applications at a higher rate, there is an unmet gap in quickly developing applications that meet both business functions and regulatory requirements.

This unmet gap is due to the complexity of modern software applications. Applications are now designed to support multiple dependencies to other services or applications and are subject to frequent software updates across multiple platforms. Applications are also required to scale on-demand.

A software application may require one or more other programs to run (the "dependencies"). Some dependencies for a program may be generic and implied, but other dependencies can be recursive with deep and complex relationships. At a high level, many programs have a dependency on the operating system, the application server, or the database server.

Currently available software tools are inefficient in monitoring and detecting flaws in the design of a software application, in part because such tools do not support any asset management of the software application or provide any application intelligence. For example, available software tools cannot provide information on the application's dependencies and data flows or the deployment configurations of the application.

Examples for such existing tools are network-based discovery tools that monitor the activity of an application over the network (for example, based on incoming/outgoing connections). Such tools suffer from many disadvantages including a prolonged discovery time (usually months) before discovering dependencies between applications, an inability to detect changes in the application over, an ability to only perform discovery at a high network level, and an inability to associate an application with any response, request, or transaction identified on the network. All disadvantages limit network-based discovery tools to provide information that is critical for application intelligence and management of assets (applications) in organizations.

It would therefore be advantageous to provide a solution that would overcome the challenges and disadvantages noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a method for providing intelligence of software applications. The method comprises collecting, from a plurality of resources, data utilized to at least execute a plurality software applications of an organization; analyzing the collected data to identify the plurality of software applications; determining, by using a static analysis process, dependencies between the software applications of the identified plurality of software applications; compiling visibility data based on the identified plurality of software applications and the determined dependencies; generating a dataflow map, wherein the dataflow map includes the visibility data; and enabling a control of at least one policy based on the visibility data included in the dataflow map.

Certain embodiments disclosed herein include a system for providing intelligence of software applications. The method comprises a processing circuitry; and a memory, the memory containing instructions that, when executed by the processing circuitry, configure the system to: collecting, from a plurality of resources, data utilized to at least execute a plurality software applications of an organization; analyze the collected data to identify the plurality of software applications; determine, by using a static analysis process, dependencies between the software applications of the identified plurality of software applications; compile visibility data based on the identified plurality of software applications and the determined dependencies; generate a dataflow map, wherein the dataflow map includes the visibility data; and enable a control of at least one policy based on the visibility data included in the dataflow map.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
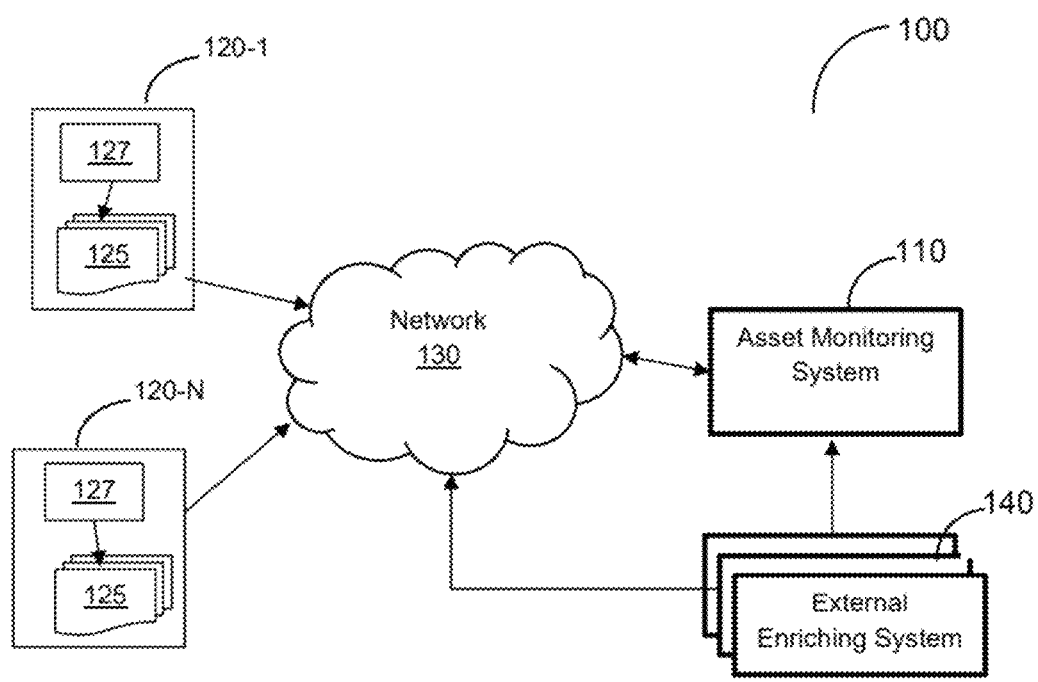
FIG. 1 is a network diagram utilized to describe the various embodiments of the disclosed application intelligence system.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural, and vice versa, with no loss of generality. In the drawings, like numerals refer to like parts through several views.

FIG. 1 is an example network diagram 100 utilized to describe the various embodiments of the disclosed application intelligence system. In the example network diagram 100, an asset monitoring system 110 (hereinafter, the system 110) is configured to analyze code of software applications (hereinafter "applications"), and to provide visibility and control for each analyzed application. In an embodiment, such visibility includes a listing of all services and resources supported or otherwise accessed by the application, all dependencies of the application, and the application architecture. The visibility of an application 125 may be viewed as a "blueprint" of the application.

In the example diagram 100, a plurality of servers 120-1 through 120-N (referred to as servers 120 or as a server 120) are connected to a network 130. The servers 120 are configured to execute the software applications. The applications 125 may be legacy applications, cloud applications, web applications, and the like. The servers 120 may include physical or virtual machines performing the functions of web servers, application servers, database servers, and the like. A server 120 may include any virtual computing environments, such as serverless, software containers, and the like. The server 120 may be deployed in a cloud computing platform, a datacenter, or on-premises with the applications to be monitored. The cloud computing platform may be a private cloud, a public cloud, a hybrid cloud, and the like. Examples of cloud computing platforms include Amazon® Web Services (AWS), Cisco® Metacloud, Microsoft® Azure®, Google® Cloud Platform, HP® Cloud, and the like.

Although not illustrated in FIG. 1, each server 120 may be connected to a data source. Such data sources may include, but are not limited to, a data lake, a data warehouse, an SQL-type database, a non-SQL type database, a data stream, and the like. A server 120 may also access network and/or cloud resources.

Also connected to the network 130 are a plurality of external enriching platforms or systems (referred to as "external enriching systems 140" or an "external enriching system 140"). An external enriching system 140 may include, but is not limited to, a network monitoring tool (e.g., VMware vRealize Network Insight (VRNI)), configured to discover traffic volumes, frequency, and the like. In another embodiment, an external enriching system 140 includes an application performance monitoring (APM) tool configured to monitor application operational health. In yet another embodiment, the external enriching system 140 includes a cloud configuration or organization tool configured to discover servers, cloud services, and other configurations related to the deployment of the applications 125 in any cloud environment.

The network 130 provides interconnectivity between the various components of the system. The network 130 may be, but is not limited to, a wireless, cellular or wired network, a local area network (LAN), a wide area network (WAN), a metro area network (MAN), the Internet, the worldwide web (WWW), similar networks, and any combination thereof. The network 130 may be a full-physical network including exclusively physical hardware, a fully-virtual network including only simulated or otherwise-virtualized components, or a hybrid physical-virtual network including both physical and virtualized components. Further, the network 130 may be configured to encrypt data, both at rest and in motion, and to transmit encrypted, unencrypted, or partially-encrypted data. The network 130 may be configured to connect with the various components of the system 100 via any combination of wired and wireless means.

For sake of simplicity of the disclosed embodiments, each server 120 can execute one or more applications and/or services (referred to as an "application 125" or as "applications 125") of a single organization. It should be appreciated that an application 125 may include a software application, a service, a program, a function, a library, or any piece of software code. Software shall be construed broadly to mean any type of instructions, whether referred to as software, firmware, middleware, microcode, hardware description language, or otherwise. Instructions may include code, such as in source code format, binary code format, executable code format, or any other suitable format of code. The code may be either already compiled, requiring a compiler, or any script code that does not require compilation.

The various embodiments are performed by the system 110 that is configured to communicate with the servers 120 over a network through application programming interfaces (APIs). The connection may be also a direct network connection through, for example, a network port. In an embodiment, each server 120 is configured with a collector 127. The collector 127 is a piece of non-persistence code utilized to collect application data, such binary code, and APIs of an application 125. The collector 127 is also configured to collect configuration files of the server 120 hosting the application(s) 125. The collected data is sent to the system 110. It should be noted that the collector 127 may be a non-persistent entity, and therefore may be, but is not necessarily, an agent that requires an installation and maintenance.

Further, the collector 127 can be triggered and deployed by a server configuration management and provisioning tool such as, but not limited to, Ansible, Chef, Puppet, AWS® Systems Manager (SSM), and the like. In another embodiment, the integration can be performed using an API of an orchestration environment (e.g., Kubernetes®). In yet another embodiment, a collector 127 is deployed on a target machine after establishing a secure connection between the system 110 and a target machine. The secure connection may be established over a secure shell (SSH) protocol.

The system 110 may also collect data about the environment in which the server 120 is deployed, such as, for example, the cloud computing application used by such environment. The system 110 may also collect data from the server 120 or other external sources utilized to run the applications 125. The system 110 may also collect credentials utilized by the applications 125 to access, for example, various data sources.

The system 110 is configured to analyze the collected data to discover all the applications 125 and their dependencies. For each such discovered application 125, its details related to a current identity of the application (e.g., the application with all updates and changes up to this point in time) are also extracted. Such details may include, but are not limited to, application or service name, last update, a list of updates, deployment type, deployment location, version, and the like. The connection to another application and a type of such connection (e.g., Representational State Transfer [REST] API) is also extracted and determined. The system 110 is further configured to generate a dataflow (topology) map showing all applications or services and their dependencies. An example for such a map is provided in FIG. 2.

Figure 2:
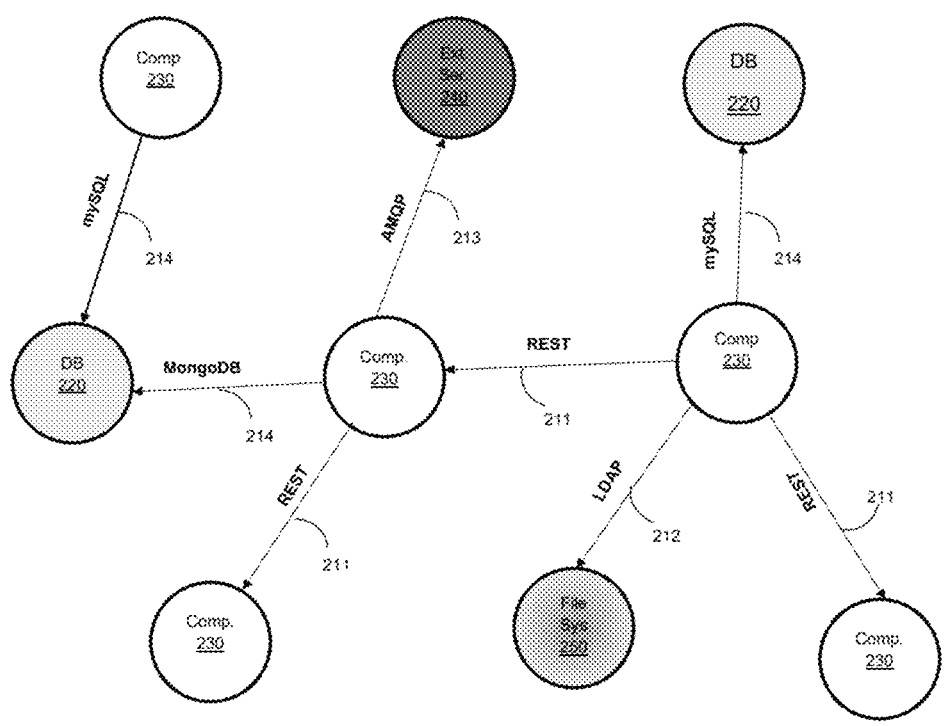
FIG. 2 is a diagram illustrating a dataflow map of dependencies between applications.

Specifically, in the example diagram shown in FIG. 2, different types of applications (or services) are shown connected through inter-application connections. Specifically, the example diagram shown in FIG. 2 includes database applications 220, compute applications 230, external third-party applications 240, and file system services 250. The compute applications 230 may perform certain computing processes such as, but not limited to, processing payments, inventory management, and the like. The database applications 220 may include any processes for accessing and manipulating a database. The database may include a Structured Query Language (SQL) database, a non-SQL database, data warehouse, data lakes, and the like. A third-party application 240 is an application executed outside of an organization (e.g., an organization including a user of a monitored application). A file system service 250 may include any local, network, or distributed file system. It should be noted that the system 110 is configured to monitor any type of compute asset including, but not limited to, a software application (e.g., native application, cloud application), a service, a program, a function, a library, and the like.

The inter-application connections 211, 212, 213, and 214 respectively include a REST API, a system call (e.g., Lightweight Directory Access Protocol [LDAP]), a messaging broker (e.g., Kafka, RabbitMQ, ActiveMQ, etc.), and a database connection (e.g., mySQL, MongoDB, PostgreSQL, Oracle DB, IBM Db2, etc.). It should be noted that the inter-application connections shown in FIG. 2 are only examples used to illustrate connections that can be applicable, and the disclosed embodiments are not limited to such examples.

Returning back to FIG. 1, it should therefore be appreciated that the system 110 is also an asset management tool to manage all applications in the organization.

In a further embodiment, the system 110 is configured to analyze the collected data to determine the architecture of the application 125. The architecture of the application 125 defines settings, services, resources, components, and the like, which the application executes, accesses, or is otherwise configured with.

Based on the determined architecture and dependencies, visibility data about the operation, configuration (including security and network), implications of certain resources, and so on, can be derived. For example and without limitation, such visibility data may include information about the dependencies and data flows of an application, encrypted connections, deployment configurations of an application, effects that may be caused by a server outage or maintenance, a service being used by one more applications, and so on.

In an embodiment, the system 110 is configured to allow querying the visibility data on the operation, configuration, impact of the applications can be derived.

In a further embodiment, the system 110 is configured to control policies such as, but not limited to, security policies of the applications 125. The policies are defined by a user (who is typically not the programmer of the application). The policies are checked against the determined visibility data. For example, if the policy requires an application 125 to authenticate using a Security Assertion Markup Language (SAML) single sign on (SSO). The system 110 can be configured to determine, based on the visibility data, if that policy is violated. The violation can be alerted or reported. As another example, based on the determined dependencies, a policy violation of multiple applications accessing a certain database can be enforced. When multiple applications (services) access the same resource, such design may cause operational degradations or slow the delivery velocity dramatically, as it would require perform deep impact analysis with each time a new version is delivered.

In an embodiment, the system 110 is further configured to monitor and detect any changes in the visibility ("blueprint") of an application 125. As noted above, visibility includes a listing of all services and resources supported or otherwise accessed by the application, all dependencies of the application, and the application architecture. Here, upon detection of a new deployment of the same application, the newly deployed application is analyzed to determine its visibility as well. Two different deployed applications are considered the same if their respective fingerprints are the same. Any difference detected in the visibility is reported. For example, if the newly deployed application provides a connection to a database, where such connection was not configured with a current deployment, this would be considered as an indication that the application's visibility has changed.

The system 110 may analyze one, some, or all of the applications 125 in the organization either when a deployment trigger occurs, or at predefined time intervals. The deployment trigger may be received from a continuous integration/continuous deployment (CI/CD) tool. Such deployment further allows gathering the binary code or other code of any application before deployment or installation of the application.

It should be noted that the system 110 may be configured as an on-premise deployment, or alternatively deployed in the cloud computing platform.

Figure 3:
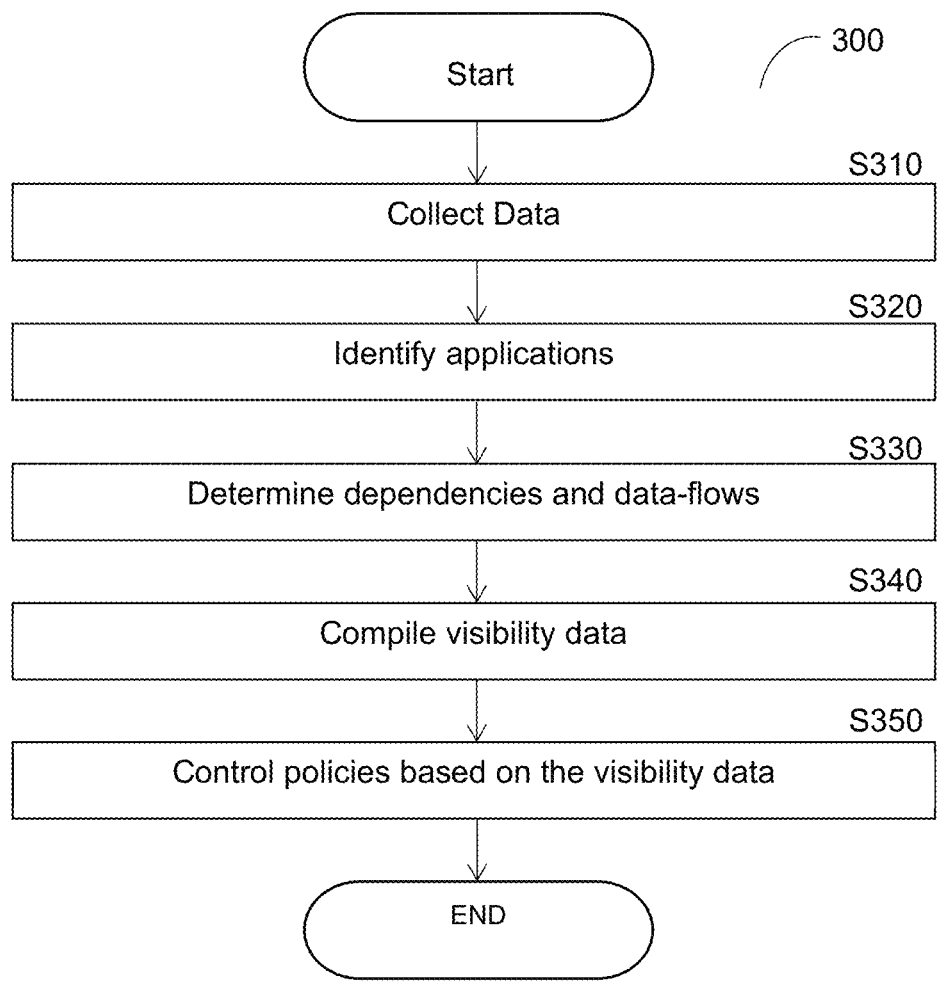
FIG. 3 is a flowchart method for providing application intelligence of software applications according to an embodiment.

FIG. 3 is an example flowchart 300 of a method for providing application intelligence on software applications according to an embodiment. The method can process or analyze each application deployed or utilized in the organization. An organization typically includes a plurality of applications having dependencies among them. As defined above, an application includes a web application, a cloud application, a legacy application, a service, a program, and the like.

At S310, application data is collected from multiple sources, utilized to execute, develop, or deployed otherwise in the organization. The collected data may include, but is not limited to, the binary code of each application, software libraries, error logs, script code, configuration files (environment variables, command line, etc.), credentials, and the like. As noted above, the binary code, or any code, is collected by collectors executed in the servers hosting the application. The data is collected per each application and may include binary code and configurations. The collection of such data can be triggered at predefined time intervals, or upon receiving an event from a software deployment tool (e.g., a CI/CD tool).

At S320, the collected data is analyzed to identify all applications in the organization. The applications in an organization may include, but are not limited to, all applications in an environment (e.g., a cloud computing environment) owned or operated by the organization. Details on each identified application are also gathered. Such details include, for example, application (service) name, version number, last update date and time, changes history, configurations (files, environment variable, command line), host configuration and setting, and so on.

It should be noted that, in order to identify all applications in the organization, every machine (and its network connection) in the organization, are monitored to determine which of the identified processes can be considered as an application. For each application, its respective binary code is collected. For example, upon detection of a Java® process, it is checked if such a process is a standalone Java® application or any other Java® application container (e.g., Springboot®, Apache Tomcat®, Oracle WebLogic®, Red Hat JBoss Application Server®, IBM WebSphere®, etc.). The binary code and configuration of the Java® application container, a standalone application, or both, is extracted. The details of each application are extracted from the application's configuration.

At S330, dependencies or otherwise data-flows between the identified applications are determined. Further, for each dependency, the type of connection is determined. Software systems are commonly assembled from many software components. Components frequently re-use other components. A dependent component or "dependency" may be required by a given component. For example, an application that executes a database transaction depends on a database component. The type of connection may include, but is not limited to, HTTP, REST API, gRPC, a database connector (e.g., mySQL, MongoDB), a message broker connector (e.g., Kafka, RabbitMQ, IBM MQ), and the like.

In an embodiment, S330 includes performing static analysis to identify, for each application binary or deployed source code, the interfaces that the application exposes, as well as any egress/ingress interfaces that the application consumes.

The static analysis process may include tracing back (or traversing) usage communication software libraries to detect or determine how the application interacts with such libraries. Each detected library is combined with the application's configuration.

Specifically, for each identified application, all applications (or services) that the identified application consumes, connects to, or communicates with, are iteratively exposed. For example, it is detected which APIs an application exposes which other services may consume (ingress/upstream interfaces). As another example, it is checked what the application consumes from other services or applications through a REST API endpoint. By inspecting multiple different applications, it can be determined, using cross correlation, what application (A) exposes that is consumed by application (B), as demonstrated in the above example.

The static analysis process may further include identifying two distinct applications that communicate with each other. To this end, in an embodiment, S330 includes identifying a first communication address designated on an ingress interface or an egress interface of a first software application; identifying a second communication address designated on an ingress interface or egress interface of a second software application; and matching the first communication address to the second communication address to determine if there is at least a partial match.

In yet another embodiment, S330 includes identifying the ingress/upstream and the respective egress/downstream interfaces of each application and matching them together. As an example:

A Service A exposes REST API over the following route: "/api/v1.0/item/{item_id}"
where {item_id} is a parameter which is passed as part of the route.

A service B creates a connection over HTTP to the following address:
"http://{service_A_host}/api/v1.0/item/{unknown_item_id}"
where "{service_A_host}" is a placeholder that can be only determined at runtime, and "{unknown_item_id}" is an item identifier (ID) that is only determined on run time. The disclosed static analysis process applies partial matching on these HTTP URL routes to identify a commonality (in this example "api/v1.0/item/{unknown_item_id}")".

The matching may be performed using regular expressions, NLP techniques, machine learning, or other AI or string-matching techniques. It should be noted that the inter-service communication is not limited to REST API, but includes other types of APIs, examples of which are provided above.

It should be appreciated that performing the static analysis process described herein, it is possible to instantaneously and accurately identify dependencies, and thus the topology and/or dataflow of the applications of an organization. The process described herein further allows creation of a unique identifier (signature) for every application, thereby allowing for detection of the same application across different versions and creation of a timeline of how the application evolved over time. Further, the static analysis process allows for detecting, in addition to network resources that an application connects with, any computing resource, dependency to other applications/services, configurations, settings, and other identifying information on each application.

At S340, visibility data is compiled based on the identified applications and their dependencies. In an embodiment, a dataflow map is generated using the visibility data. An example of such a dataflow map is illustrated in FIG. 2.

At S350, one or more policies are controlled based on the visibility data. Examples of such control policies are provided above. The policies may be predefined by a user (e.g., system administrator) of an organization in which the managed applications are managed. In an embodiment, predefined policies can be updated, or new policies may be automatically created (e.g., by the system 110) based on the determined dataflow map and its contents.

Figure 4:
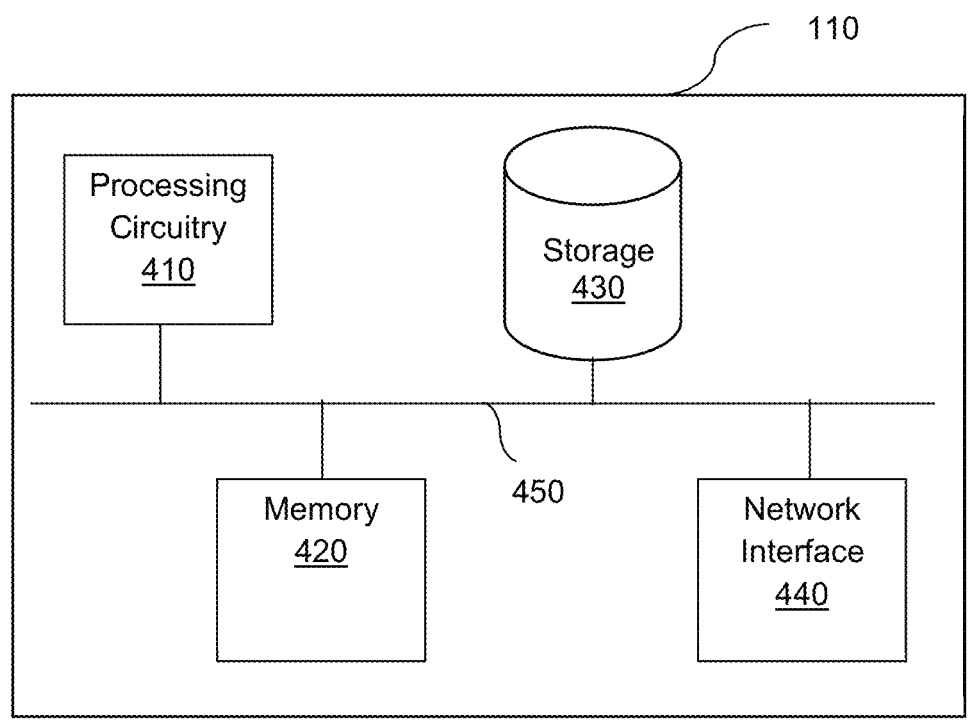
FIG. 4 is a schematic diagram of the application intelligence system, according to an embodiment.

FIG. 4 shows an example block diagram of the system 110 implemented according to an embodiment. The system 110 includes a processing circuitry 410 coupled to a memory 420, a storage 430, and a network interface 440. In an embodiment, the components of the system 110 may be communicatively connected via a bus 450, e.g., PCIe, or another high-speed data bus.

The processing circuitry 410 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), system-on-a-chip systems (SOCs), general-purpose microprocessors, microcontrollers, graphics processing units (GPUs), tensor processing units (TPUs), general-purpose microprocessors, microcontrollers, and digital signal processors (DSPs), and the like, or any other hardware logic components that can perform calculations or other manipulations of information.

The memory 420 may be volatile (e.g., RAM, etc.), non-volatile (e.g., ROM, flash memory, etc.), or a combination thereof. In one configuration, computer readable instructions to implement one or more embodiments disclosed herein may be stored in the storage 430.

In another embodiment, the memory 420 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by one or more processors, cause the processing circuitry 410 to perform the various processes described herein.

The storage 430 may be magnetic storage, optical storage, and the like, and may be realized, for example, as flash memory or other memory technology, CD-ROM, Digital Versatile Disks (DVDs), or any other medium which can be used to store the desired information.

The network interface 440 allows the system 110 to communicate with at least one of the various data sources or databases. It should be understood that the embodiments described herein are not limited to the specific architecture illustrated in FIG. 4, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for providing intelligence of software applications, comprising:
    collecting, from a plurality of resources, data utilized to at least execute a plurality of software applications of an organization;
    analyzing the collected data to identify the plurality of software applications;
    determining, by using a static analysis process, dependencies between the software applications of the identified plurality of software applications, wherein
    determining dependencies between the plurality of identified software applications includes traversing the collected data of each of the plurality of software applications to detect usage of at least one software library and detecting how each of the plurality of software applications interact with its respective identified software applications;
    compiling visibility data based on the identified plurality of software applications and the determined dependencies;
    generating a dataflow map, wherein the dataflow map includes the visibility data; and
    enabling a control of at least one policy based on the visibility data included in the dataflow map.

2. The method of claim 1, further comprising:
    reporting the dataflow map.

3. The method of claim 1, wherein analyzing the collected data to identify the plurality of software applications further comprises:
    identifying identity details of each software application of the plurality of software applications.

4. The method of claim 3, wherein the identity details of each software application include at least one of: name, version number, update date and time, changes history, application configurations, and application host configurations.

5. The method of claim 1 further comprising:
    identifying two distinct software applications of the plurality of software applications that communicate with each other; and
    determining, by using a static analysis process, dependencies between the identified two distinct software applications based on their communication and software library usage.

6. The method of claim 5, wherein identifying two distinct software applications that communicate with each other further comprises:
    identifying a first communication address designated on an ingress interface or an egress interface of a first software application;
    identifying a second communication address designated on an ingress interface or an egress interface of a second software application; and
    matching the first communication address to the second communication address to determine if there is at least a partial match.

7. The method of claim 6, wherein each communication address includes any one of: an application programming interface (API), a Uniform Resource Locator (URL), and a route designating a resource.

8. The method of claim 1, wherein the collected data includes at least one of: binary code, script software libraries, error logs, script code, configuration files, and credentials.

9. The method of claim 8, wherein collecting the data further comprises:
interfacing with a collector included in each source, wherein the collector is a piece of non-persistent code.

10. The method of claim 1, wherein each of the plurality of software applications is any one of: a software application, a service, a program, a function, a library, and a piece of software code or script.

11. A non-transitory computer readable medium having stored thereon instructions for causing a processing circuitry to execute a process, the process comprising:
collecting, from a plurality of resources, data utilized to at least execute a plurality of software applications of an organization;
analyzing the collected data to identify the plurality of software applications;
determining, by using a static analysis process, dependencies between the software applications of the identified plurality of software applications, wherein
determining dependencies between the plurality of identified software applications includes traversing the collected data of each of the plurality of software applications to detect usage of at least one software library and detecting how each of the plurality of software applications interact with its respective identified software applications;
compiling visibility data based on the identified plurality of software applications and the determined dependencies;
generating a dataflow map, wherein the dataflow map includes the visibility data; and
enabling a control of at least one policy based on the visibility data included in the dataflow map.

12. A system for providing intelligence of software applications; comprising:
a processing circuitry; and
a memory, the memory containing instructions that, when executed by the processing circuitry, configure the system to:
collect, from a plurality of resources, data utilized to at least execute a plurality of software applications of an organization;
analyze the collected data to identify the plurality of software applications;
determine, by using a static analysis process, dependencies between the software applications of the identified plurality of software applications;
traverse the collected data of each of the plurality of software applications to detect usage of at least on software library;
detect how each of the plurality of software applications interact with its respective identified software applications;
compile visibility data based on the identified plurality of software applications and the determined dependencies;
generate a dataflow map, wherein the dataflow map includes the visibility data; and
enable a control of at least one policy based on the visibility data included in the dataflow map.

13. The system of claim 12, wherein the system is further configured to:
reporting the dataflow map.

14. The system of claim 12, wherein the system is further configured to:
plurality of software applications further comprising:
identify identity details of each software application of the plurality of software applications.

15. The system of claim 14, wherein the identity details of each software application include at least one of: name, version number, update date and time, changes history, application configurations, and application host configurations.

16. The system of claim 12, wherein the system is further configured to:
identify two distinct software applications of the plurality of software applications that communicate with each other; and
determine, by using a static analysis process, dependencies between the identified two distinct software applications based on their communication and software library usage.

17. The system of claim 16, wherein the system is further configured to:
identify a first communication address designated on an ingress interface or an egress interface of a first software application;
identify a second communication address designated on an ingress interface or an egress interface of a second software application; and
match the first communication address to the second communication address to determine if there is at least a partial match.

18. The system of claim 17, wherein each communication address includes any one of: an application programming interface (API), a Uniform Resource Locator (URL), and a route designating a resource.

19. The system of claim 12, wherein the collected data includes at least one of: binary code, script software libraries, error logs, script code, configurations files, and credentials.

20. The system of claim 12, wherein the system is further configured to:
interface with a collector included in each source, wherein the collector is a piece of non-persistent code.

21. The system of claim 12, wherein each of the plurality of software applications is any one of: a software application, a service, a program, a function, a library, and a piece of software code.

22. The system of claim 12, wherein the system is further configured to:
detect any changes between visibility data of two different deployments of the same software application.

23. The method of claim 10, further comprising:
detecting any changes between visibility data of two different deployments of the same software application.

* * * * *